United States Patent
Simon

(10) Patent No.: US 11,350,237 B2
(45) Date of Patent: May 31, 2022

(54) SYSTEM AND METHOD FOR DETERMINING SMARTPHONE LOCATION

(71) Applicant: Sfara Inc., Hoboken, NJ (US)

(72) Inventor: Sascha Simon, Warwick, NY (US)

(73) Assignee: Sfara, Inc., Hoboken, NJ (US)

( * ) Notice: Subject to any disclaimer, the term of this patent is extended or adjusted under 35 U.S.C. 154(b) by 2119 days.

(21) Appl. No.: 14/105,934

(22) Filed: Dec. 13, 2013

(65) Prior Publication Data

US 2014/0179353 A1 Jun. 26, 2014

Related U.S. Application Data

(63) Continuation-in-part of application No. 14/072,231, filed on Nov. 5, 2013, now Pat. No. 9,333,946, and a continuation-in-part of application No. 14/095,156, filed on Dec. 3, 2013, now abandoned, and a
(Continued)

(51) Int. Cl.
*H04W 4/02* (2018.01)
*G01S 5/02* (2010.01)

(52) U.S. Cl.
CPC .......... *H04W 4/023* (2013.01); *G01S 5/0252* (2013.01)

(58) Field of Classification Search
CPC ....... H04W 4/023; H04W 4/043; H04W 4/02; H04W 4/04; G01S 5/0252
See application file for complete search history.

(56) References Cited

U.S. PATENT DOCUMENTS

| | | | |
|---|---|---|---|
| 5,785,347 | A | 7/1998 | Adolph et al. |
| 6,411,250 | B1 | 6/2002 | Oswald et al. |
| 7,136,828 | B1 | 11/2006 | Allen et al. |

(Continued)

FOREIGN PATENT DOCUMENTS

| | | |
|---|---|---|
| EP | 0461888 A2 | 12/1991 |
| JP | 10-260241 A | 9/1998 |

(Continued)

OTHER PUBLICATIONS

PCT/US2013/076432 International Search Report and Written Opinion, dated Apr. 9, 2014, Ham, Joung Hyun.
(Continued)

*Primary Examiner* — Regis J Betsch
*Assistant Examiner* — Jeremy A Delozier
(74) *Attorney, Agent, or Firm* — Christopher J. Volkmann; Kelly, Holt & Christenson PLLC

(57) ABSTRACT

A device is provided for use with a database having stored therein, a plurality of signatures corresponding to a plurality of fields, respectively, wherein the plurality of fields correspond to a plurality of locations, respectively. The device includes an accessing component, a field-detecting component, a comparing component and an identifying component. The accessing component can access one of the plurality of signatures from the database. The field-detecting component can detect a first field based on a first location and can generate a detected field signature based on the detected first field. The comparing component can generate a comparison signal based on a comparison of the detected field signature and one of the plurality of signatures. The identifying component can identify the first location based on the comparison signal.

18 Claims, 7 Drawing Sheets

Related U.S. Application Data continuation-in-part of application No. 14/105,744, filed on Dec. 13, 2013, now Pat. No. 8,989,952.

(60) Provisional application No. 61/740,814, filed on Dec. 21, 2012, provisional application No. 61/740,831, filed on Dec. 21, 2012, provisional application No. 61/740,851, filed on Dec. 21, 2012, provisional application No. 61/745,677, filed on Dec. 24, 2012.

(56) References Cited

U.S. PATENT DOCUMENTS

| | | |
|---|---|---|
| 7,415,126 B2 | 8/2008 | Breed et al. |
| 7,904,053 B2 | 3/2011 | Krasner et al. |
| 8,082,014 B2 | 12/2011 | Causey et al. |
| 2003/0029345 A1 | 2/2003 | Tiernan et al. |
| 2003/0209893 A1 | 11/2003 | Breed et al. |
| 2004/0152471 A1 | 8/2004 | Macdonald et al. |
| 2004/0257208 A1 | 12/2004 | Huang et al. |
| 2006/0085153 A1 | 4/2006 | Oesterling et al. |
| 2006/0089153 A1 | 4/2006 | Sheynblat |
| 2007/0021915 A1 | 1/2007 | Breed et al. |
| 2008/0203814 A1 | 8/2008 | Kamiya |
| 2008/0287143 A1 | 11/2008 | Banks et al. |
| 2009/0037056 A1 | 2/2009 | Erb |
| 2009/0309709 A1 | 12/2009 | Bevacqua et al. |
| 2010/0063649 A1 | 3/2010 | Wu et al. |
| 2011/0169654 A1 | 7/2011 | Ketari |
| 2011/0301795 A1 | 12/2011 | Failing |
| 2012/0123634 A1 | 5/2012 | Shimizu |
| 2012/0135764 A1 | 5/2012 | Ohashi |
| 2012/0158249 A1 | 6/2012 | Xu et al. |
| 2012/0208517 A1 | 8/2012 | Zohar |
| 2012/0282885 A1 | 11/2012 | Hamed et al. |
| 2013/0130639 A1 | 5/2013 | Oesterling et al. |
| 2013/0253775 A1 | 9/2013 | Shimizu |
| 2013/0344859 A1* | 12/2013 | Abramson ........... G06Q 50/265 455/418 |
| 2014/0179348 A1 | 6/2014 | Simon |
| 2014/0179353 A1 | 6/2014 | Simon |
| 2014/0180563 A1 | 6/2014 | Simon |
| 2014/0180615 A1 | 6/2014 | Simon |

FOREIGN PATENT DOCUMENTS

| | | |
|---|---|---|
| JP | 2007-183865 A | 7/2007 |
| JP | 2009-177758 A | 8/2009 |
| WO | WO 03-095276 A1 | 11/2003 |

OTHER PUBLICATIONS

PCT/US2013/076410 International Search Report and Written Opinion, dated Apr. 7, 2014, Song, Ho Keun.
PCT/US2013/076426 International Search Report and Written Opinion, dated Apr. 9, 2014, Ham, Joung Hyun.
PCT/US2013/076440 International Search Report and Written Opinion, dated Apr. 9, 2014, Sohn, Byoung Cheol.

* cited by examiner

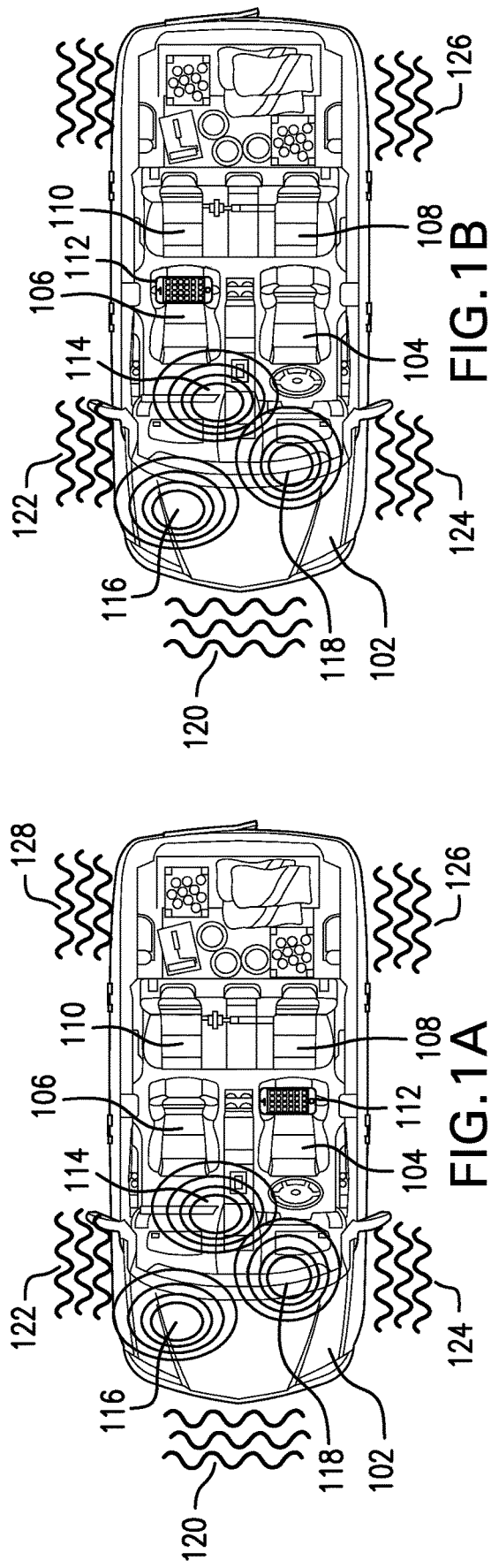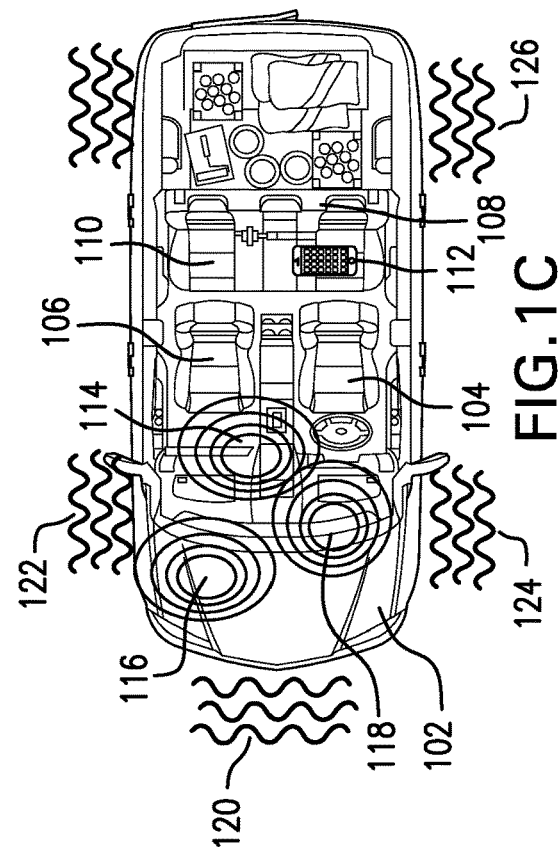

SYSTEM AND METHOD FOR DETERMINING SMARTPHONE LOCATION

The present application claims priority from: U.S. Provisional Application No. 61/740,814 filed Dec. 21, 2012; U.S. Provisional Application No. 61/740,831 filed Dec. 21, 2012; U.S. Provisional Application No. 61/740,851 filed Dec. 21, 2012; and U.S. Provisional Application No. 61/745,677 filed Dec. 24, 2012, the entire disclosures of which are incorporated herein by reference. The present application is a continuation-in-part of U.S. application Ser. No. 14/072,231 filed Nov. 5, 2013, is a continuation-in-part of U.S. application Ser. No. 14/095,156 filed Dec. 3, 2013, and is a continuation-in-part of U.S. application Ser. No. 14/105,744 filed Dec. 13, 2013, the entire disclosures of which are incorporated herein by reference.

BACKGROUND

Vehicle telematics is the technology of sending, receiving and storing information to and from vehicles and is generally present (at least to a limited extent) in the automotive marketplace today. For example, both General Motors (through their OnStar offering) and Mercedes Benz (through their Tele-Aid and more recent mbrace system offering) have long offered connected-vehicle functionality to their customers. Both of these offerings make use of the data available on a vehicle's CAN bus, which is specified in the OBD-II vehicle diagnostics standard. For example, the deployment of an airbag, which suggests that the vehicle has been involved in a crash, may be detected by monitoring the CAN bus. In this event, a digital wireless telephony module that is embedded in the vehicle and connected to the vehicle's audio system (i.e., having voice connectivity) can initiate a phone call to a telematics service provider (TSP) to "report" the crash. Vehicle location may also be provided to the TSP using the vehicle's GPS functionality. Once the call is established, the TSP representative may attempt to communicate with the vehicle driver, using the vehicle's audio system, to assess the severity of the situation. Assistance may thus be dispatched by the TSP representative to the vehicle as appropriate.

Historically, these services were focused entirely on driver and passenger safety. These types of services have expanded since their initial roll-out, however, and now offer additional features to the driver, such as concierge services. The services, however, remain mainly focused on voice based driver to call center communication, with data services being only slowly introduced, hindered by low bandwidth communication modules, high cost and only partial availability on some model lines.

As a result, while generally functional, vehicle telematics services have experienced only limited commercial acceptance in the marketplace. There are several reasons for this. In addition to low speeds and bandwidth, most vehicle drivers (perhaps excluding the premium automotive market niche) are reluctant to pay extra for vehicle telematics services, either in the form of an upfront payment (i.e. more expensive vehicle) or a recurring (monthly/yearly) service fee. Moreover, from the vehicle manufacturer's perspective, the services require additional hardware to be embedded into the vehicle, resulting in extra costs on the order of $250 to $350 or more per vehicle which cannot be recouped. Thus, manufacturers have been slow to fully commit to or invest in the provision of vehicle telematics equipment in all vehicles.

There have been rudimentary attempts in the past to determine when a smartphone is in a moving vehicle. Wireless service provider AT&T, Sprint and Verizon, for example, offer a smartphone application that reacts in a specific manner to incoming text messages and voice calls when a phone is in what AT&T calls DriveMode™. With the AT&T DriveMode application, a wireless telephone is considered to be in "drive mode" when one of two conditions are met. First, the smartphone operator can manually turn on the application, i.e., she "tells" the application to enter drive mode. Alternatively, when the DriveMode application is in automatic on/off mode and the smartphone GPS sensor senses that the smartphone is travelling at greater than 25 miles per hour, the GPS sensor so informs the DriveMode application, the DriveMode application concludes that the smartphone is in a moving vehicle, and drive mode is entered.

Both of these paths to engaging the AT&T DriveMode application—the "manual" approach to entering drive mode and the "automatic" approach to entering drive mode—are problematic. First, if the smartphone operator forgets or simply chooses not to launch the DriveMode application prior to driving the vehicle when the application is in manual mode then the application will not launch. Second, in automatic on/off mode AT&T's use of only the GPS sensor to determine when a smartphone is in a moving vehicle is problematic for a number of reasons. First, the speed threshold of the application is arbitrary, meaning that drive mode will not be detected/engaged at less than 25 mph. If the vehicle is stopped in traffic or at a traffic signal, for example, then the DriveMode application may inadvertently terminate. Second, and perhaps more importantly, AT&T's DriveMode application requires that the smartphone's GPS functionality be turned on at all times. Because the use of a smartphone's GPS sensor is extremely demanding to the battery resources of a smartphone, this requirement severely undermines the usefulness of AT&T's application. Thirdly this method does not differentiate between the type of vehicle that the phone is in, e.g. a bus, a taxi or a train and therefore allows no correlation between the owner of the phone and her driving situation. For the classic embedded telematics devices to be replaces by smartphones it is important to correlate the driver and smartphone owner with her specific location within a vehicle. Only then the smartphone can truly take the functional role of an embedded telematics device in a vehicle.

However, given that interactions with a smartphone while operating a vehicle are at least problematic and prohibited in a variety of states, it is considered unsafe to allow interactions with a phone in a vehicle for the driver. The situation is entirely different for passengers. Passengers should not be constrained in their smartphone usage while being in a vehicle. Accordingly, for at least the foregoing reasons there exists a need to provide an improved method and apparatus of determining the specific location of a smartphone. Such a technology is today not commercially available.

SUMMARY

The present invention provides an improved method and apparatus of determining the specific location of a smartphone.

Various embodiments described herein are drawn to a device for use with a database having stored therein, a plurality of signatures corresponding to a plurality of fields, respectively, wherein the plurality of fields correspond to a plurality of locations, respectively. The device includes an accessing component, a field-detecting component, a comparing component and an identifying component. The accessing component can access one of the plurality of signatures from the database. The field-detecting component can detect a first field based on a first location and can generate a detected field signature based on the detected first field. The comparing component can generate a comparison signal based on a comparison of the detected field signature and one of the plurality of signatures. The identifying component can identify the first location based on the comparison signal.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIGS. 1A-C illustrate the magnetic fields and vibrations associated with a vehicle as detected by a communication device located at three different locations within the vehicle, respectively, in accordance with aspects of the present invention;

DETAILED DESCRIPTION

Figure 2:
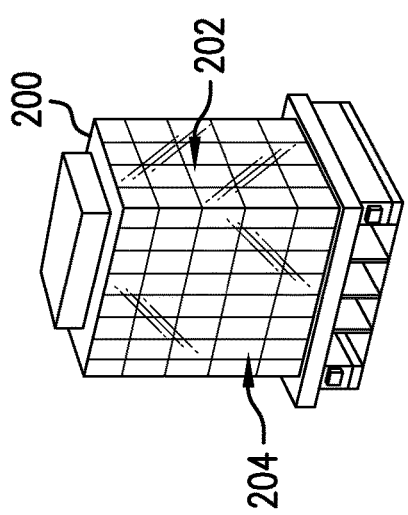
FIG. 2 illustrates a building.

Aspects of the present invention are drawn to a system and method for determining a specific location by utilizing parameters within and/or near the specific location.

As used herein, the term "smartphone" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or other devices that can include a radio frequency transceiver and a pager, Internet/Intranet access, Web browser, organizer, calendar and/or a global positioning system (GPS) receiver; and/or conventional laptop (notebook) and/or palmtop (netbook) computer(s), tablet(s), or other appliance(s), which include a radio frequency transceiver. As used herein, the term "smartphone" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more location(s).

In one non-limiting example embodiment, a smartphone is used to measure parameters within a vehicle to identify the user's location within the vehicle. In another non-limiting example embodiment, a smartphone is used to measure parameters within a room in a building to identify the user's location within the building. These aspects will now be described in more detail with reference to FIGS. 1A-2B.

As shown in FIG. 1A, a vehicle 102 includes a driver seat 104, a front passenger seat 106, a rear passenger seat 108 and a rear passenger seat 110. In this example, a person (not shown) is holding, or having in the immediate vicinity, a communication device 112, e.g., a smartphone, (not shown) in accordance with an aspect of the present invention, wherein the person is sitting in driver seat 104.

While running, electronic portions of vehicle 102 will generate magnetic fields, a sample of which are represented by field lines 114, 116 and 118. Further, the engine of vehicle 102 may generate vibrations represented by lines 120 and the tires rolling on the pavement will generate vibrations represented by lines 122, 124, 126 and 128.

As shown in FIG. 1B, the person (not shown) is holding, or having in the immediate vicinity, communication device 112, while sitting in passenger seat 106. As shown in FIG. 1C, the person (not shown) is holding communication device 112, while sitting in rear passenger seat 108.

In accordance with aspects of the present invention, communication device 112 may detect parameters within vehicle 102 to determine a more exact location of communication device 112. In this example embodiment, communication device 112 may detect the magnetic fields and the vibrations to determine the location of the user within vehicle 102. In accordance with another aspect of the present invention, this location determination may be used to operate communication device 112 in a particular mode, e.g., enabling predetermined features or functions associated with a specific location and/or disabling other predetermined features or functions associated with the specific location.

For example, the magnitude or vectors of the fields and vibrations as detected by communication device 112 when it is located in driver seat 104 may be compared with similar fields and vibrations associated with driver seat 104. Such a similarity in detected parameters may enable communication device 112 to determine that it is located near diver seat 104.

Further, the magnitude or vectors of the fields and vibrations as detected by communication device 112 when it is located in driver seat 104 as shown in FIG. 1A, may be distinguished from the magnitude or vectors of the fields and vibrations detected by communication device 112 when it is located in passenger seat 106 as shown in FIG. 1B, which may additionally be distinguished from the magnitude or vectors of the fields and vibrations detected by communication device 112 when it is located in rear passenger seat 108 as shown in FIG. 1C.

When it is determined that communication device 112 is located in driver seat 104, certain features may be enabled/disabled/modified, e.g., hands-free talking may be enabled and texting may be disabled to prevent drivers from being distracted. Similarly, when it is determined that communication device 112 is located in passenger seat 104, certain features may be enabled/disabled/modified, e.g., texting may be enabled.

This in-vehicle location determination may be particularly useful in the context of public transportation. For example, some conventional communications devices may determine whether they are in a vehicle and then operate in a vehicle mode, wherein certain features or functions are enabled/disabled/modified to prevent a driver of the vehicle from being distracted. However, such automatic mode switching may be an annoyance when the user is merely a passenger on a train or a public bus. In accordance with aspects of the present invention, a communication device may more precisely determine whether the user is a driver of a vehicle, or merely a passenger. As such, a communication device in accordance with the present invention will prevent situations where it operates in a vehicle mode when the user is not a driver of the vehicle.

The in-vehicle location determination discussed above with reference to FIG. 1A-C is but one example implementation in accordance with aspects of the present invention. Another non-liming example implementation includes determining a specific location within a building, which will now be further described with reference to FIGS. 2-4.

As shown in FIG. 2, a building 200 includes a computer server room 202 and a board room 204.

Figure 3:
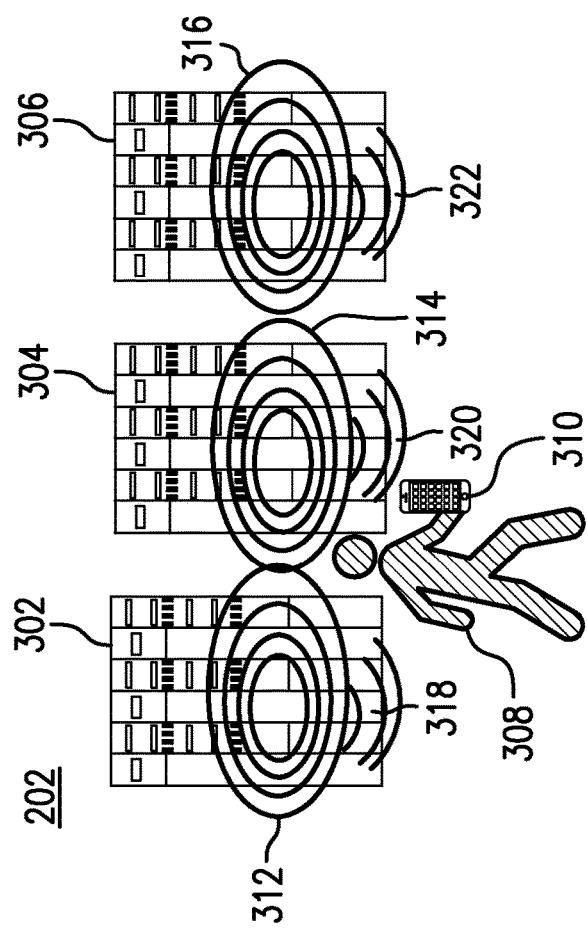
FIG. 3 illustrates the magnetic fields and sounds associated with a server room, as detected by a communication device in accordance with aspects of the present invention.

FIG. 3 is a view of computer server room 202, which includes server 302, server 304 and server 306. A person 308 in computer server room 202 is carrying a communication device 310, in accordance with aspects of the present invention. Server 302 generates magnetic fields 312, server 304 generates magnetic fields 314 and server 306 generates magnetic fields 316. Server 302 generates sound as represented by field lines 318, server 304 generate sound as represented by field lines 320 and server 306 sound as represented by field lines 322.

Figure 4:
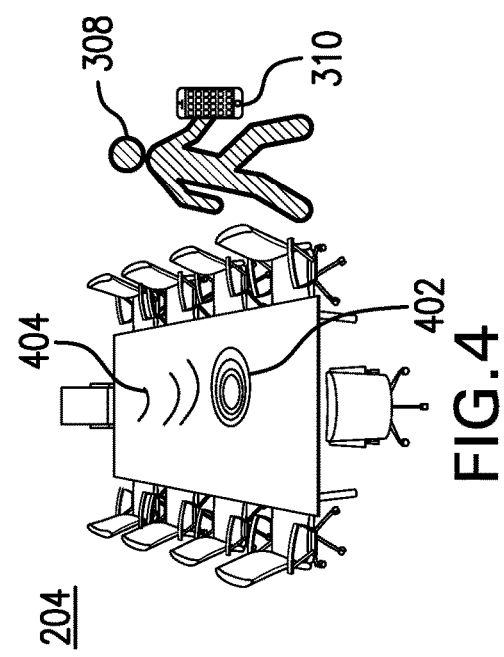
FIG. 4 illustrates the magnetic fields and sounds associated with a board room, as detected by a communication device in accordance with aspects of the present invention.

FIG. 4 is a view of board room 204. Person 308 in board room 204 is carrying communication device 310. Much fewer electronic devices (not shown) in board room 204 generate magnetic fields 402. Further, sounds within board room 204 are much less, as compared to computer server room 202, as represented by field lines 404.

In this example embodiment, communication device 310 may detect the magnetic fields and the sounds to determine that the location of person 308 within building 200. In accordance with another aspect of the present invention, this location determination may be used to operate communication device 310 in a particular mode, e.g., enabling predetermined features or functions associated with a specific location and/or disabling other predetermined features or functions associated with the specific location.

For example, the magnitude or vectors of the fields and sounds as detected by communication device 310 when it is located computer server room 202 may be compared with similar fields and sounds associated with computer server room 202. Such a similarity in detected parameters may enable communication device 310 to determine that it is located in computer server room 202.

Further, the magnitude or vectors of the fields and sounds as detected by communication device 310 when it is located in computer server room 202 as shown in FIG. 3, may be distinguished from the magnitude or vectors of the fields and sounds detected by communication device 310 when it is located in board room 204 as shown in FIG. 4.

When it is determined that communication device 310 is located in computer server room 202, certain features may be enabled/disabled/modified, e.g., ring volume may be increased so person 308 can hear a ring over the sound of computer servers 302, 304 and 306. Similarly, when it is determined that communication device 310 is located in board room 204, certain features may be enabled/disabled/modified, e.g., ring volume may be decreased so as not to disrupt a meeting within board room 204.

A more detailed discussion of example working embodiment will now be discussed with additional reference to FIGS. 5-11.

Figure 5:
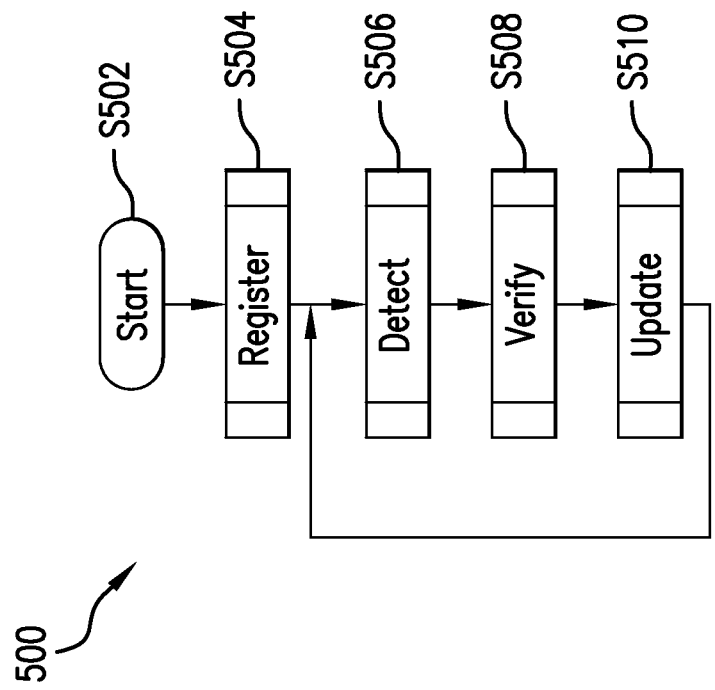
FIG. 5 illustrates an example method of identifying a location in accordance with aspects of the present invention.

FIG. 5 illustrates an example method 500 of identifying a location in accordance with aspects of the present invention.

Method 500 starts (S502) and a location is registered (S504). For example, returning to FIG. 1A, if a person would like to be able to identify the position of driver seat 104 within vehicle 102, the position of driver seat 104 would be registered based on detectable parameters associated with driver seat 104. Similarly, returning to FIG. 1B, if a person would like to be able to identify the position of passenger seat 106 within vehicle 102, the position of passenger seat 106 would be registered based on detectable parameters associated with passenger seat 106. In another example, returning to FIGS. 2-3, if a person would like to be able to identify the location of computer server room 202 within building 200, the location of computer server room 202 would be registered based on detectable parameters associated with computer server room 202. Similarly, returning to FIGS. 2 and 4, if a person would like to be able to identify location of board room 204 within building 202, the location of board room 204 would be registered based on detectable parameters associated with board room 202. A more detailed discussion of registration will now be provided with additional reference to FIGS. 6-11.

Figure 6:
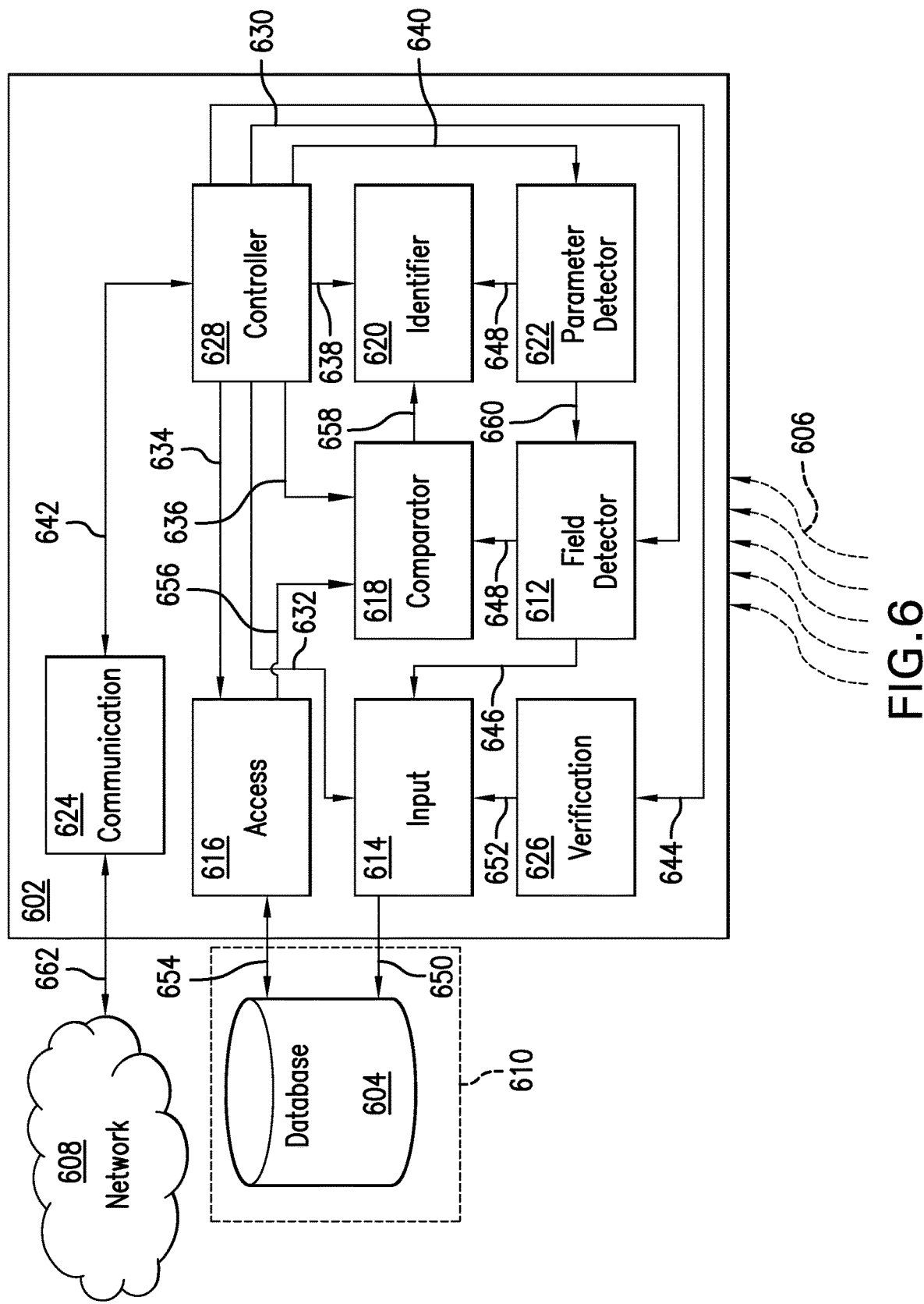
FIG. 6 illustrates an example device for identifying a location in accordance with aspects of the present invention.

FIG. 6 illustrates an example device 602 for identifying a location in accordance with aspects of the present invention.

FIG. 6 includes a device 602, a database 604, a field 606 and a network 608. In this example embodiment, device 602 and database 604 are distinct elements. However, in some embodiments, device 602 and database 604 may be a unitary device as indicated by dotted line 610.

Device 602 includes a field-detecting component 612, an input component 614, an accessing component 616, a comparing component 618, an identifying component 620, a parameter-detecting component 622, a communication component 624, a verification component 626 and a controlling component 628.

In this example, field-detecting component 612, input component 614, accessing component 616, comparing component 618, identifying component 620, parameter-detecting component 622, communication component 624, verification component 626 and controlling component 628 are illustrated as individual devices. However, in some embodiments, at least two of field-detecting component 612, input component 614, accessing component 616, comparing component 618, identifying component 620, parameter-detecting component 622, communication component 624, verification component 626 and controlling component 628 may be combined as a unitary device. Further, in some embodiments, at least one of field-detecting component 612, input component 614, accessing component 616, comparing component 618, identifying component 620, parameter-detecting component 622, communication component 624, verification component 626 and controlling component 628 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controlling component 628 is arranged to communicate with: field-detecting component 612 via a communication line 630: input component 614 via a communication line 632; accessing component 616 via a communication line 634; comparing component 618 via a communication line 636; identifying component 620 via a communication line 638; parameter-detecting component 622 via a communication line 640; communication component 624 via a communication line 642; and verification component 626 via a communication line 644. Controlling component 628 is operable to control each of field-detecting component 612, input component 614, accessing component 616, comparing component 618, identifying component 620, parameter-detecting component 622, communication component 624 and verification component 626.

Field-detecting component 612 is additionally arranged to detect field 606, to communicate with input component 614 via a communication line 646, to communicate with comparing component 618 via a communication line 648 and to communicate with parameter-detecting component 622 via a communication line 645. Field-detecting component 612 may be any known device or system that is operable to detect a field, non-limiting examples of which include an electric field, a magnetic field, and electro-magnetic field and combinations thereof. In some non-limiting example embodiments, field-detecting component 612 may detect the amplitude of a field at an instant of time. In some non-limiting example embodiments, field-detecting component 612 may detect a field vector at an instant of time. In some non-limiting example embodiments, field-detecting component 612 may detect the amplitude of a field as a function over a period of time. In some non-limiting example embodiments, field-detecting component 612 may detect a field vector as a function over a period of time. In some non-limiting example embodiments, field-detecting component 612 may detect a change in the amplitude of a field as a function over a period of time. In some non-limiting example embodiments, field-detecting component 612 may detect a change in a field vector as a function over a period of time. Field-detecting component 612 may output a signal based on the detected field.

Input component 614 is additionally arranged to communicate with database 604 via a communication line 650 and to communicate with verification component 626 via a communication line 652. Input component 614 may be any known device or system that is operable to input data into database 604. Non-limiting examples of input component 614 include a graphic user interface (GUI) having a user interactive touch screen or keypad.

Accessing component 616 is additionally arranged to communicate with database 604 via a communication line 654 and to communicate with comparing component 618 via a communication line 656. Accessing component 616 may be any known device or system that access data from database 604.

Comparing component 618 is additionally arranged to communicate with identifying component 620 via a communication line 658. Comparing component 618 may be any known device or system that is operable to compare two inputs.

Parameter-detecting component 622 is additionally arranged to communicate with identifying component 622 via a communication line 660. Parameter-detecting component 622 may be any known device or system that is operable to detect a parameter, non-limiting examples of which include velocity, acceleration, angular velocity, angular acceleration, geodetic position, light, sound, temperature, vibrations, pressure, biometrics, contents of surrounding atmosphere and combinations thereof. In some non-limiting example embodiments, parameter-detecting component 622 may detect the amplitude of a parameter at an instant of time. In some non-limiting example embodiments, parameter-detecting component 622 may detect a parameter vector at an instant of time. In some non-limiting example embodiments, parameter-detecting component 622 may detect the amplitude of a parameter as a function over a period of time. In some non-limiting example embodiments, parameter-detecting component 622 may detect a parameter vector as a function over a period of time. In some non-limiting example embodiments, parameter-detecting component 622 may detect a change in the amplitude of a parameter as a function over a period of time. In some non-limiting example embodiments, parameter-detecting component 622 may detect a change in a parameter vector as a function over a period of time.

Communication component 624 is additionally arranged to communicate with network 608 via a communication line 662. Communication component 624 may be any known device or system that is operable to communicate with network 608. Non-limiting examples of communication component include a wired and a wireless transmitter/receiver.

Verification component 626 may be any known device or system that is operable to provide a request for verification. Non-limiting examples of verification component 626 include a graphic user interface having a user interactive touch screen or keypad.

Communication lines 630, 632, 634, 636, 638, 640, 642, 644, 645, 646, 648, 650, 652, 654, 656, 658, 660 and 662 may be any known wired or wireless communication line.

Database 604 may be any known device or system that is operable to receive, store, organize and provide (upon a request) data, wherein the "database" refers to the data itself and supporting data structures. Non-limiting examples of database 604 include a memory hard-drive and a semiconductor memory.

Network 608 may be any known linkage of two or more communication devices. Non-limiting examples of database 608 include a wide-area network, a local-area network and the Internet.

For purposes of discussion, consider the following example where a person is registering the position of driver seat 104 within vehicle 102. This example will now be described with additional reference to FIG. 7.

Figure 7:
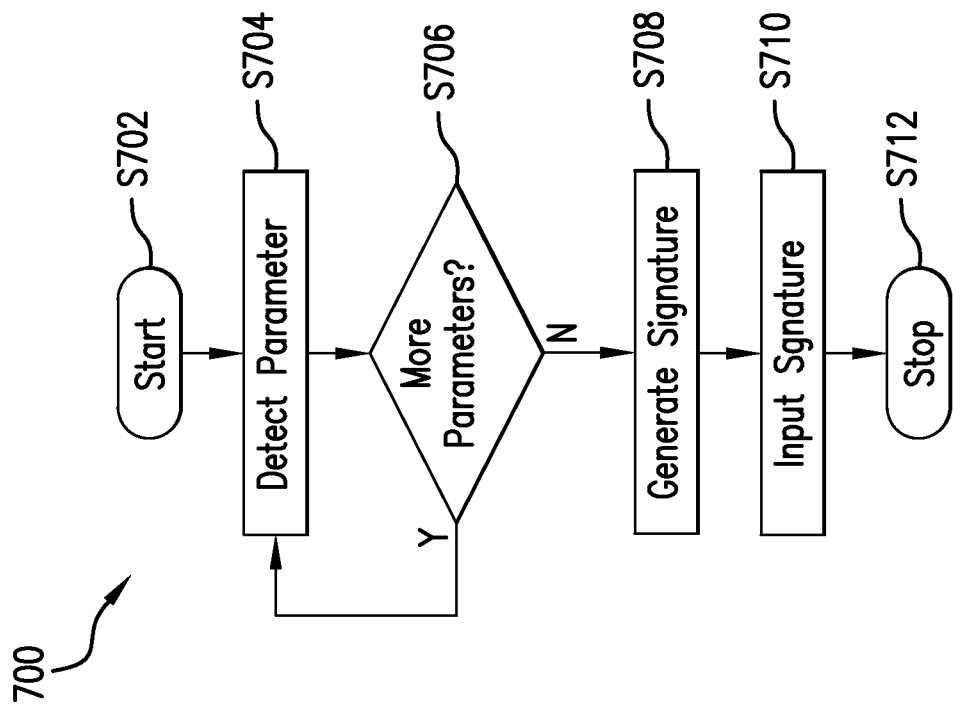
FIG. 7 illustrates an example method of registering a location in accordance with aspects of the present invention.

FIG. 7 illustrates an example method 700 of registering a location in accordance with aspects of the present invention.

Method 700 starts (S702) and a parameter is detected (S704). For example, returning to FIG. 6, field-detecting component 612 detects field 606. For purposes of discussion, let field 606 be a magnetic field corresponding to the superposition of magnetic fields generated by all electronic and mechanical systems involved with the running vehicle, e.g., magnetic fields 114, 116 and 118 as shown in FIG. 1A.

In one example embodiment, returning to FIG. 6, parameter-detecting component 622 detects light or a change in light. For purposes of discussion, let the light be within server room 202. In some example embodiments, the light may actually be modulated in any known manner, non-limiting examples of which include amplitude modulation, pulse width modulation, pulse number modulation, frequency modulation, polarization modulation and combinations thereof. In some example embodiments, the modulated light provides parameter-detecting component 622 with information that identifies server room 202 in accordance with known communication networks using visible light illumination. For example, the light may be pulse code modulated with a signal that identifies server room 202. As such, at any time device 602 is located in server room 202 such that parameter-detecting component 622 receives such modulated light, device 602 will identify the location as server room 202.

Returning to FIG. 7, after the first parameter is detected (S704) it is determined whether more parameters are to be detected (S706). For example, returning to FIG. 6, controlling component 628 may instruct at least one of field-detecting component 612 and parameter-detecting component 622 to detect another parameter.

A magnetic field may be a relatively distinct parameter that may be used to determine whether device 602 is in a specific location. However, there may be situations that elicit a false positive—e.g., a magnetic field that erroneously indicates that device 602 is in a passenger seat of a vehicle is actually associated with the operation of a vending machine that is not in the vehicle. As such, in order to reduce the probability of a false positive indication that device 602 is in a specific location, a second parameter associated with the location may be used. Along this notion, it is an example aspect of the invention to detect a plurality of parameters associated with a location to increase the probability of a correct identification of the location.

In some embodiments, device 602 has a predetermined number of parameters to detect, wherein controlling component 628 may control such detections. For example, the first parameter to be detected (in S704) may be a magnetic field associated with a running vehicle, wherein controlling component 628 may instruct field-detecting component 612 to detect a magnetic field. Further, a second parameter to be detected may be another known detected parameter additionally associated with the running vehicle, e.g., vibrations in the chassis, wherein controlling component 628 may instruct parameter-detecting component 622 to detect the second parameter. Further parameter-detecting component 622 may be able to detect many parameters. This will be described with greater detail with reference to FIG. 8.

Figure 8:
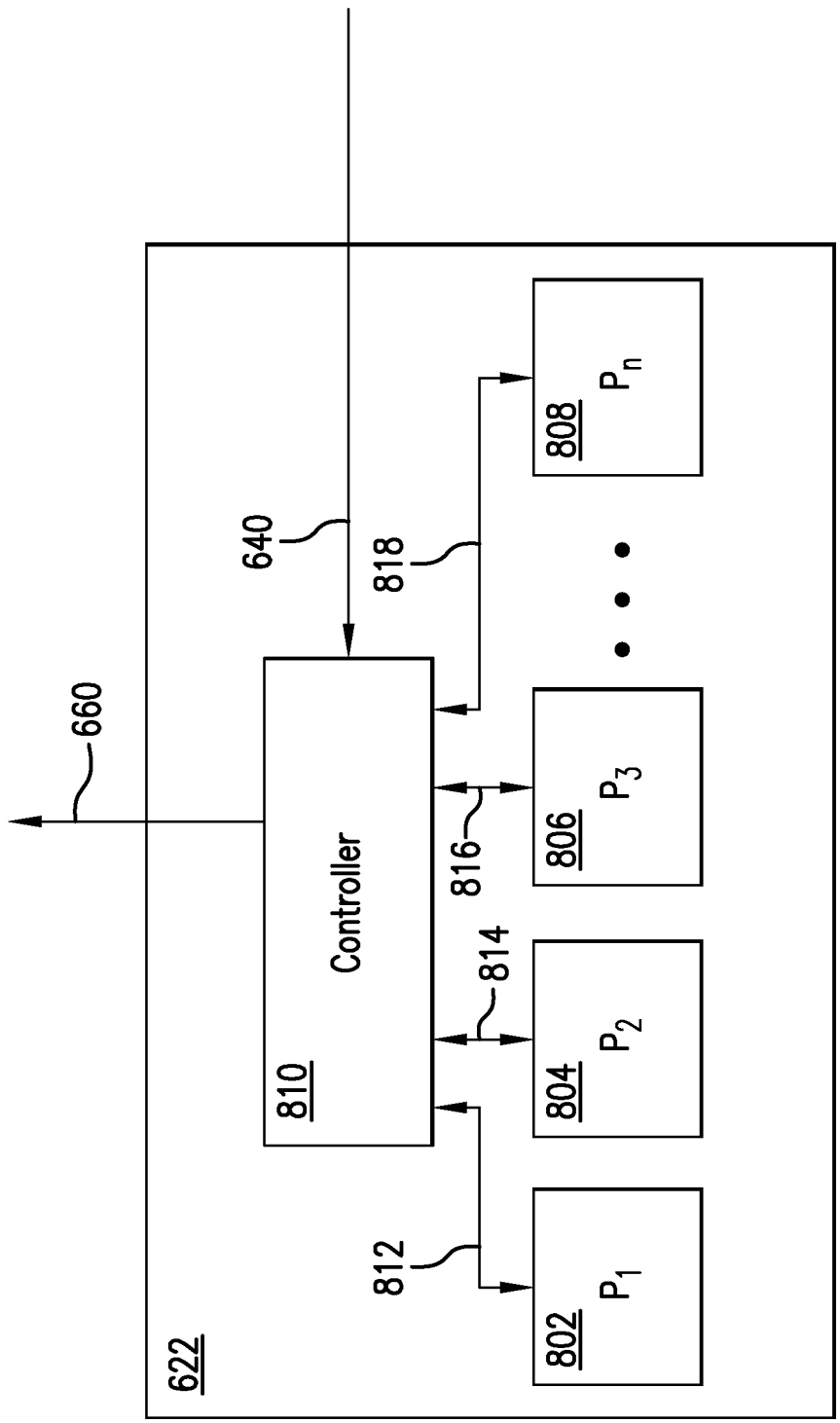
FIG. 8 illustrates an example parameter-detecting component in accordance with aspects of the present invention.

FIG. 8 illustrates an example parameter-detecting component 622.

As shown in the figure, parameter-detecting component 622 includes a plurality of detecting components, a sample of which are indicated as a first detecting component 802, a second detecting component 804, a third detecting component 806 and an n-th detecting component 808. Parameter-detecting component 622 additionally includes a controlling component 810.

In this example, detecting component 802, detecting component 804, detecting component 806, detecting component 808 and controlling component 810 are illustrated as individual devices. However, in some embodiments, at least two of detecting component 802, detecting component 804, detecting component 806, detecting component 808 and controlling component 810 may be combined as a unitary device. Further, in some embodiments, at least one of detecting component 802, detecting component 804, detecting component 806, detecting component 808 and controlling component 810 may be implemented as a computer having tangible computer-readable media for carrying or having computer-executable instructions or data structures stored thereon.

Controlling component 810 is configured to communicate with: detecting component 802 via a communication line 812: detecting component 804 via a communication line 814; detecting component 806 via a communication line 816; and detecting component 808 via a communication line 818. Controlling component 810 is operable to control each of detecting component 802, detecting component 804, detecting component 806 and detecting component 808. Controlling component 810 is additionally configured to communicate with controlling component 628 of FIG. 6 via communication line 640 and to communicate with field-detecting component 612 of FIG. 6 via communication line 660.

The detecting components may each be a known detecting component that is able to detect a known parameter. For example each detecting component may be a known type of detector that is able to detect at least one of magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof. For purposes of discussion, let: detecting component 802 be able to detect deceleration in three dimensions; detecting component 804 be able to detect sound; detecting component 806 be able to detect vibrations; and detecting component 808 be able to detect geodetic position.

In some non-limiting example embodiments, at least one of the detecting components of parameter-detecting component 622 may detect a respective parameter as an amplitude at an instant of time. In some non-limiting example embodiments, at least one of the detecting components of parameter-detecting component 622 may detect a respective parameter as a function over a period of time.

Each of the detecting components of parameter-detecting component 622 is able to generate a respective detected signal based on the detected parameter. Each of these detected signals may be provided to controlling component 810 via a respective communication line.

Controlling component 810 is able to be controlled by controlling component 628 via communication line 640.

Consider the example situation where communication device 602 generates a signature of a driver seat of a vehicle, wherein field detecting component 612 detects a magnetic field associated with the driver seat of the vehicle, and wherein detecting component 806 detects vibrations associated vibrations traveling through the chassis of the vehicle. In such a situations, a signature will be based on two parameters as opposed to just one parameter.

Returning to FIG. 7, once all the parameters have been detected (S706), a signature is generated (S708).

In some embodiments, for example as shown in FIG. 6, field-detecting component 612 may generate a signature of the vehicle based on signals associated with the detected magnetic fields, and combinations thereof. In some embodiments, field-detecting component 612 may additionally process any of the signals associated with the detected magnetic fields and combinations thereof to generate such a signature. Non-limiting examples of further processes include averaging, adding, subtracting, and transforming any of the signals associated with the detected magnetic fields and combinations thereof.

Returning to FIG. 7, once the signature is generated (S708), the signature in input into memory (S710). For example, as shown in FIG. 6, field-detecting component 612 provides the signature to input component 614 via communication line 646.

In an example embodiment, input component 614 includes a GUI that informs a user of device 602 that a signature has been generated. Input component 614 may additionally enable the user to input an association between a location and the generated signature. For example, input component 614 may display on a GUI a message such as "A signature was generated. To what location is the signature associated?" Input component 614 may then display an input prompt for the user to input, via the GUI, a location to be associated with the generated signature.

Input component 614 may then provide the signature, and the association to a specific location, to database 604 via communication line 650.

As discussed above, in some embodiments, database 604 is part of device 602, whereas in other embodiments, database 604 is separate from device 602. Data input and retrieval from database 604 may be Faster when database 604 part of device 602, as opposed to cases where database 604 is distinct from device 602. However, size may be a concern when designing device 602, particularly when device 602 is intended to be a handheld device such as a smartphone. As such, device 602 may be much smaller when database 604 is distinct from device 602, as opposed to cases where database 604 is part of device 602.

Consider an example embodiment, where database 604 is part of device 602. In such cases, input component 614 may enable a user to input signatures and the location associations, for a predetermined number of locations. In this manner, database 604 will only be used for device 602.

Now consider an example embodiment, where database 604 is separate from device 602. Further, let database 604 be much larger than the case where database 604 is part of device 602. Still further, let database 604 be accessible to other devices in accordance with aspects of the present invention. In such cases, input component 614 may enable a user to input signatures and the location associations, for a much larger predetermined number of locations. Further, in such cases, input component 614 may enable other users of similar devices to input signatures and the location associations, for even more locations.

An example embodiment may use the differentiating magnetic field properties between different vehicle types and makes to identify the different vehicle types and makes. Today's vehicles are fully equipped with electronic and mechanical actuators and switches, engine subsystems. All these subsystems are generating their own electromagnetic and magnetic fields and therefore will alter the overall three-dimensional properties and field strength fluctuations of the vehicle interior. Particularly the running of a vehicle generates a characteristic magnetic flux for every vehicle. Aspects of the present invention include a storing these field properties associated with different seat locations within the vehicle as signatures within database 604 through measurements in the near field within the vehicle interior for a reference group of make and models. As such, any user of a device may be able to identify a registered vehicle within database 604. Thus, through previously stored signatures and additional measurements, the present invention enables a library of vehicular seating position electromagnetic signatures. This library may be augmented with additional measurements describing the electromagnetic signatures of different seating position within different vehicles. This will be described in greater detail later with reference to FIG. 13.

At this point, method 700 stops (S712).

In the examples discussed above with respect to FIGS. 6-8, field-detecting component 612 is detecting magnetic fields as field vectors as functions over a period of time. The detected signals illustrated in FIGS. 6-8 are easily distinguishable from one another. Accordingly, the vehicles associated therewith, respectively, may additionally be easily distinguishable from one another.

Returning to FIG. 7, method 700 may involve the detection of additional parameters to associate with a location. Specifically, additional aspects of the present invention are drawn to a system and method for determining a specific location by utilizing: 1) field properties within and/or near the specific location; and 2) additionally detected parameters. In one non-limiting example embodiment, a smartphone is used to measure a magnetic field associated with a specific seating position within vehicle, and to measure vibrations associated with the specific seating position within the vehicle.

For example, returning to FIG. 6, parameter-detecting component 622 may be used to detect another parameter for use in detecting a specific seating position within a vehicle. For purposes of discussion, consider the example where a person is registering the driver seat position within their vehicle, wherein parameter-detecting component 622 measures vibrations of the vehicle. In this example, the detected magnetic signals as measured by the driver seat position are easily distinguishable from magnetic signals as measured from the passenger seat. However, in situations where the magnetic field signatures may be somewhat similar, it may be more difficult for a device in accordance with aspects of the present invention to distinguish positions within a vehicle—solely on the detected magnetic (or electric or electro-magnetic) fields. As such, the use of further distinguishing with at least a second detected parameter may help distinguish the positions within the vehicle.

In an example embodiment, field-detecting component 612 may detect magnetic field vectors as measured at the location of driver seat 104 of vehicle 102, for example as discussed above with reference to FIG. 1A, whereas parameter-detecting component 622 may detect vibrations associated with the engine and tires of vehicle 102. An overall signature may be generated based on the signatures generated from each of field-detecting component 612 and parameter-detecting component 622.

In another example embodiment, field-detecting component 612 may detect magnetic field vectors measured at the location of computer server room 202 of building 200, whereas parameter-detecting component 622 may detect ambient noise associated with computer server room 202 of building 200. An overall signature may be generated based on the signatures generated from each of field-detecting component 612 and parameter-detecting component 622.

Returning to FIG. 5, after the location has been registered (S504), a location is detected (S506). For example, the next time the person rides in a vehicle, a device in accordance with aspects of the present invention would detect a field associated with the position within the vehicle. Similarly, for example, the next time the person is in a specific location, such a room in a building, a device in accordance with aspects of the present invention would detect a field associated with the location. A more detailed discussion of registration will now be provided with additional reference to FIG. 9.

Figure 9:
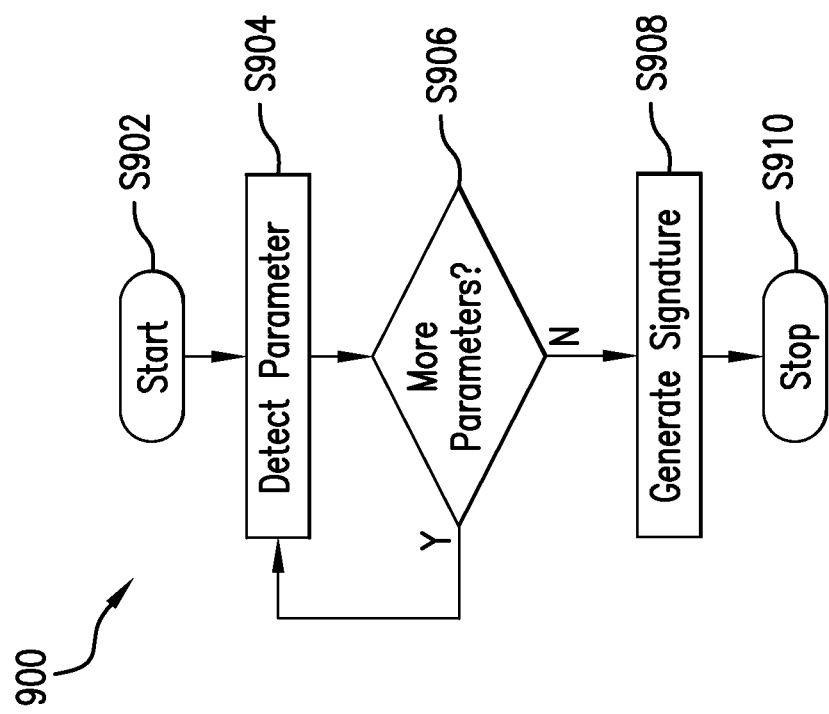
FIG. 9 illustrates an example method of generating a signature in accordance with aspects of the present invention.

FIG. 9 illustrates an example method 900 of detecting a location in accordance with aspects of the present invention.

Method 900 starts (S902) and a parameter is detected (S904). This is the same as the field being detected (S504) as discussed above with reference to method 500. For example, returning to FIG. 6, field-detecting component 612 detects a new field. For purposes of discussion, let the new field be a magnetic field corresponding to the superposition of magnetic fields generated by all electronic and mechanical systems as detected at the location of driver seat 104.

Returning to FIG. 9, after the first parameter is detected (S904) it is determined whether more parameters are to be detected (S906). This is similar to method 700 (S706) of FIG. 7.

Returning to FIG. 9, once all the parameters have been detected (S906), a signature is generated (S908). This is similar to the signature being generated (S506) as discussed above with reference to method 500. In some embodiments, for example as shown in FIG. 6, field-detecting component 612 may generate a signature of the vehicle based on any of the signals associated with the detected magnetic fields. In some embodiments, field-detecting component 612 may additionally process any of the signals associated with the detected magnetic fields to generate such a signature. Non-limiting examples of further processes include averaging, adding, subtracting, and transforming and combinations thereof, of any of the signals associated with the detected magnetic fields.

This second signature is provided to comparing component 618 via communication line 648.

At this point, method 900 stops (S910).

Returning to FIG. 5, after the location has been detected (S506), it is verified (S508). For example, a device in accordance with aspects of the present invention would determine whether the newly detected location is the location within the vehicle that was previously registered. Similarly, a device in accordance with aspects of the present invention would determine whether the newly detected location is the location within the building that was previously registered. A more detailed discussion of registration will now be provided with additional reference to FIG. 10.

Figure 10:
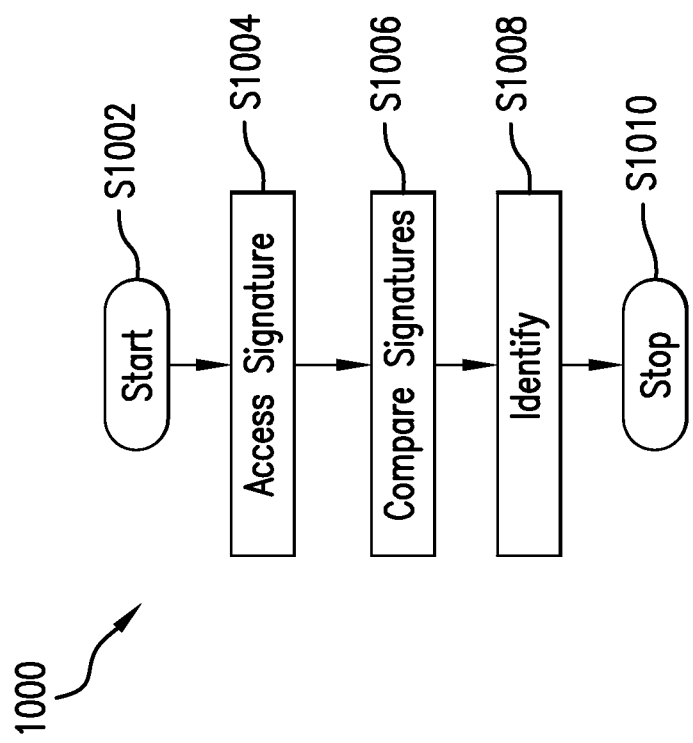
FIG. 10 illustrates an example method of verifying a location in accordance with aspects of the present invention.

FIG. 10 illustrates an example method 1000 of verifying a location in accordance with aspects of the present invention.

Method 1000 starts (S1002) and the previously stored signature is accessed (S1004). For example, as shown in FIG. 6, access component 616 retrieves the previously-stored signature from database 604 via communication line 654. Access component 616 then provides the retrieved, previously-stored signature to comparator 618 via communication line 656.

Returning to FIG. 10, now that the previously stored signature has been accessed (S1004), the signatures are compared (S1006). For example, as shown in FIG. 6, comparator 618 compares the retrieved, previously stored signature as provided by access component 616 with the newly generated signature as provided by field-detecting component 612.

Returning to FIG. 10, now that the signatures have been compared (S1006), the location may be identified (S1008). For example, as shown in FIG. 6, comparator 618 provides an output to identifying component 620 via communication line 658. If the retrieved, previously stored signature as provided by access component 616 matches the newly generated signature as provided by field-detecting component 612, then the newly detected location is the same location that was previously registered. In such a case, identifying component 620 may indicate that the newly detected location is the same location that was previously registered. If the retrieved, previously stored signature as provided by access component 616 does not match the newly generated signature as provided by field-detecting component 612, then the newly detected location is not the same location that was previously registered. In such a case, identifying component 620 may indicate that the newly detected location is not the same location that was previously registered.

At this point, method 1000 stops (S1010).

In another example embodiment, returning to FIG. 5, a new location may be detected and verified (S506 and S508) in a manner discussed in U.S. application Ser. No. 14/095,156 filed Dec. 3, 2013. In particular, the location may be identified based on a location probability, wherein variations between the newly generated signature and the previously-stored signature will decrease the generated location probability, thus decreasing the likelihood that the newly-detected location is the same as the previously-detected location. Any known method of comparing two signatures to generate such a probability may be used.

Returning to FIG. 5, after the location has been verified, the data is updated (S510). For example, in some embodiments, as shown in FIG. 6, comparator 618 may determine that the previously stored signature as provided by access component 616 does not exactly match the newly generated signature as provided by field-detecting component 612, but the difference between the previously stored signature as provided by access component 616 does not exactly match the newly generated signature as provided by field-detecting component 612 is within a predetermined acceptable limit. In such cases, identifying component 620 may indicate that the newly detected location is still the same location that was previously registered. Further, comparator 618 may provide the newly generated signature as provided by field-detecting component 612 to access component 616 via communication line 656. Access component 616 may then provide the newly generated signature to database 604 via communication line 654.

In this manner, database 604 may be "taught" to accept variations of previously registered signatures. In some embodiments, an average of recognized signatures may be stored for future use. In some embodiments, a plurality of each recognized signature may be stored for future use.

In some embodiments, a difference between a newly-generated signature and a previously-stored signature may be used for vehicle diagnostics. In general, the operation of a vehicle may cause changes to parts and/or systems of the vehicle over time, as a result of wear and tear on the parts and/or systems of vehicle. These changes may manifest as changes in parameters detected by field-detecting component 612 or parameter-detecting component 622, which will manifest as changes in generated signatures. These changes in the generated signatures may be used as an early warning system of potential problems of the vehicle. The user may then take steps for preventive maintenance for the vehicle.

In particular, consider the situation where a newly generated signature differs somewhat from a previously stored signature. However, in this situation, the difference is within a predetermined threshold. In some embodiments, device 602 may request verification from the user that the location is actually the identified location. For example, a difference in a detected signature may be based on vibrations resulting from a misaligned tire that resulted from running over a pothole. In such a case, the GUI of input component 614 may prompt the user with a statement such as, "Are you in the passenger seat of your vehicle?" If the user positively responds, then the device may further GUI of input component 614 may prompt the user to take steps for preventive maintenance for the vehicle with a statement such as, "You may want to have your alignment checked." Of course this is a non-limiting example used to illustrate the preventive maintenance aspect of the present invention. In other non-limiting examples, device 602 may indicate suggestions for preventive maintenance associated with other locations.

Returning to FIG. 5, after updating (S510) device 602 waits to detect a new field (S506).

In theory, there may be situations in which a communication device may erroneously indicate that it is located at a specific location, i.e., provide a false positive identification of a specific location. Specifically, in theory, it is possible that a detected field and detected additional parameters associated with a specific room in a building may render a signature that matches a signature associated with a driver seat of a particular vehicle. As such, in theory, it is possible that a communication device may erroneously switch to a mode for use in the wrong location. Another aspect of the invention addresses such situations, thus reducing the likelihood of false positive identifications. This will now be described in greater detail with reference to FIG. 11.

Figure 11:
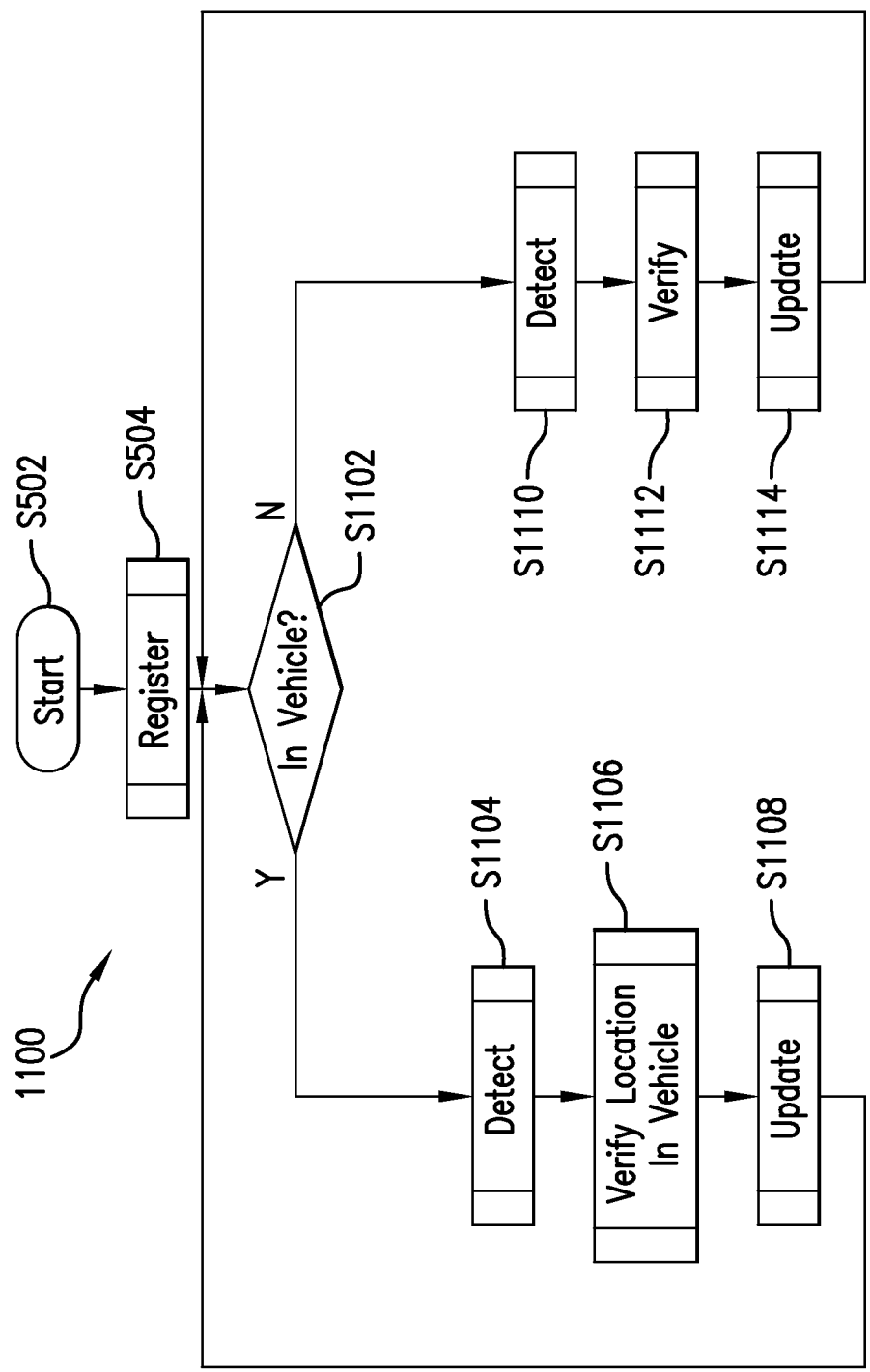
FIG. 11 illustrates another example method of identifying a location in accordance with aspects of the present invention.

FIG. 11 illustrates an example method 1100 of identifying a location in accordance with aspects of the present invention.

Method 1100 is similar to method 500 discussed above with reference to FIG. 5. However, in method 1100, it is first determined whether the communication device is in a vehicle before detecting parameters for identification. By first narrowing classification of the detected parameters to those in a vehicle and those not in a vehicle, the number of false positive identifications is greatly reduced.

Method 1100 starts (S502) and a location is registered (S504). This is similar to that discussed above with reference to method 500 of FIG. 5.

Returning to FIG. 11, after the location has been registered (S504), it is determined whether the communication device is in a vehicle (S1102). For example, returning to FIGS. 1A-C, device 112 may determine that it is in vehicle 102 by any known method, non-limiting examples of which include detecting parameters and comparing the detected parameters with those associated with vehicle 102. Non-limiting examples of known parameters include magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, light, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in light, a change in sound, a change in temperature, a change in vibrations in any of three dimensions, a change in pressure in any of three dimensions, a change in biometrics, a change in contents of surrounding atmosphere and combinations thereof.

In an example embodiment, device 112 determines whether it is in a vehicle as described in copending U.S. application Ser. No. 14/105,744 filed Dec. 13, 2013. For example, device 112 may detect at least one of many parameters. As shown in FIG. 6, database 604 may have stored therein known parameter values that are indicative of being in a vehicle. Comparing component 618 may compare signals based on the detected parameters with a previously stored signature corresponding to a vehicle in database 604. Identifying component 620 may generate an in-vehicle signal indicating that device is in a vehicle based on the comparison by comparing component 618.

Returning to FIG. 11, if it is determined that the communication device is located within a vehicle (Y at S1102), a location is detected (S1104). This is similar to that discussed above with reference to method 500 (S506) discussed above with reference to FIGS. 5 and 9.

Returning to FIG. 11, after the location has been detected (S1104), it is verified (S1106). This is similar to that discussed above with reference to method 500 (S508) discussed above with reference to FIGS. 5 and 10. However, in this case, the previously stored signature that is accessed (S1004), is limited to signatures associated with being in a vehicle. This will reduce the likelihood of false positive in-vehicle location identifications because no signatures associated with locations outside of the vehicle will be used.

In another example embodiment, returning to FIG. 11, a new location may be detected and verified (S1104 and S1106) in a manner discussed in U.S. application Ser. No. 14/095,156 filed Dec. 3, 2013. In particular, the location may be identified based on a location probability, wherein variations between the newly generated signature and the previously-stored signature will decrease the generated location probability, thus decreasing the likelihood that the newly-detected location is the same as the previously-detected location. Any known method of comparing two signatures to generate such a probability may be used.

Returning to FIG. 11, after the location has been verified (S1106), the data is updated (S1108). This is similar to that discussed above with reference to method 500 (S510) discussed above with reference to FIG. 5.

Again, as discussed above with reference to FIG. 5, in some embodiments, a difference between a newly-generated signature and a previously-stored signature may be used for vehicle diagnostics.

Returning to FIG. 11, device 602 again determines whether it is located in a vehicle (S1102).

Returning to FIG. 11, if it is determined that the communication device is not located within a vehicle (N at S1102), a location is detected (S1110). This is similar to that discussed above with reference to method 500 (S506) discussed above with reference to FIGS. 5 and 9.

Returning to FIG. 11, after the location has been detected (S1110), it is verified (S1112). This is similar to that discussed above with reference to method 500 (S508) discussed above with reference to FIGS. 5 and 10. However, in this case, the previously stored signature that is accessed (S1004), excludes signatures associated with being in a vehicle. This will reduce the likelihood of false positive non-vehicular related location identifications because no signatures associated with locations inside of a vehicle will be used.

In another example embodiment, returning to FIG. 11, a new location may be detected and verified (S1110 and S1112) in a manner discussed in U.S. application Ser. No. 14/095,156 filed Dec. 3, 2013. In particular, the location may be identified based on a location probability, wherein variations between the newly generated signature and the previously-stored signature will decrease the generated location probability, thus decreasing the likelihood that the newly-detected location is the same as the previously-detected location. Any known method of comparing two signatures to generate such a probability may be used.

Returning to FIG. 11, after the location has been verified (S1112), the data is updated (S1114). This is similar to that discussed above with reference to method 500 (S510) discussed above with reference to FIG. 5.

Again, as discussed above with reference to FIG. 5, in some embodiments, a difference between a newly-generated signature and a previously-stored signature may be used for diagnostics associated with other locations.

Returning to FIG. 11, device 602 again determines whether it is located in a vehicle (S1102).

The example embodiments discussed above are drawn to identifying, via a communication device, a specific location using fields and other parameters associated therewith. Once identified, other functions of the communication device may be available. For example, consider the situation wherein a communication device in accordance with aspects of the present invention is embodied in a smartphone. In such an example, once a location (e.g., a position within a vehicle or a specific room within a building) is identified, the smartphone may institute a suite of applications and turn off other applications. In a specific example embodiment, the identification of a vehicle may be used to place a smartphone in a "Vehicle Mode," wherein the smartphone will operate in a particular manner because it is determined to be in a vehicle.

In accordance with aspects of the present invention discussed above, the sensors and functionalities of smartphones can be used to supplement or even replace the known vehicle-based techniques of vehicle telematics. More specifically, smartphone-to-smartphone (when both phones are in Vehicle Mode), smartphone-to-infrastructure and infrastructure-to-smartphone communications (again, when the smartphone is in Vehicle Mode) can provide drivers with a wide range of telematics services and features, while resulting in little or no additional cost to the vehicle driver (because she likely already has a smartphone) or the vehicle manufacturer (because it doesn't have to provide the purchaser of the vehicle with a smartphone and also doesn't have to embed costly vehicle telematics equipment in the vehicle). To be able to do so, however, the smartphone again has to be able to "know" that it is in Vehicle Mode and be able to determine in what vehicle it is. Ideally for various applications it is necessary to be able to determine if the smartphone is in the vehicle that is owned by the smartphone user. Aspects of the present invention enable a smartphone to know that it is in Vehicle Mode based on detected magnetic, electric, magneto-electric fields and combinations thereof.

Further in accordance with the present invention, a smartphone may utilize its magnetometer function to periodically measure the electromagnetic levels sensed at the smartphone's current location. The smartphone uses its processing capabilities to try to map the periodic electromagnetic levels sensed by the smartphone with the vehicular electromagnetic signatures stored in library. If the periodic electromagnetic levels sensed by the smartphone match any of the specific vehicle signatures stored in the library, then the processor of the smartphone may generate and/or otherwise output a signal indicating that the smartphone is located in the specific vehicle, which in turn will be used by the Vehicle Mode detection method to trigger certain functions.

The Vehicle Mode relevant sensor suite may be monitored at intervals depending on detected speed and location, for example, up to several times per second. The magneto metric sensor output may be monitored dependent on the accelerometer output as this will indicate a movement of the phone either within the vehicle environment or of the vehicle itself.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A device, for use with a database having stored therein a plurality of signatures corresponding to a plurality of fields, respectively, each of the plurality of signatures associated with one of a plurality of locations, said device comprising:

an accessing component operable to access a first signature from the plurality of signatures stored in the database,
wherein the first signature is associated with a first location;
a field-detecting component operable to detect a detected field present at a device location and to generate a detected field signature based on the detected field;
a comparing component operable to generate a comparison signal based on a comparison of the detected field signature and the first signature;
an identifying component operable to identify the first location associated with the first signature as the device location, based on the comparison signal;
a verification component operable to provide a request for verification that the device location is the identified first location, based on the comparison signal; and
an input component operable to input a verification based on the request for verification,
wherein the verification component provides the request for verification only upon a determination, based on the comparison signal, that (a) the detected field signature and the first signature do not match and (b) a difference between the detected field signature and the first signature is within a predetermined threshold.

2. The device of claim 1, wherein said field-detecting component is operable to detect the detected field as a function over a period of time.

3. The device of claim 1, further comprising:
a parameter detector operable to detect a parameter and to generate a parameter signal based on the detected parameter,
wherein said identifying component is operable to identify the first location based additionally on the parameter signal.

4. The device of claim 3, wherein said parameter detector is operable to detect, as the parameter, one of the group consisting of a geodetic location, time, sound, acceleration, velocity and combinations thereof.

5. The device of claim 1, further comprising a communication component operable to wirelessly communicate with a network.

6. The device of claim 1,
wherein said field-detecting component is operable to detect the detected field as a first magnetic field, and
wherein said identifying component is further operable to identify the first location as a driver's position within the car.

7. A method, for use with a database having stored therein a plurality of signatures corresponding to a plurality of fields, respectively, each of the plurality of signatures associated with one of a plurality of locations, said method comprising:
accessing, via an accessing component, a first signature from the plurality of signatures stored in the database, wherein the first signature is associated with a first location;
detecting, via a field-detecting component, a detected field present at a device location;
generating, via the field-detecting component, a detected field signature based on the detected field;
generating, via a comparing component, a comparison signal based on a comparison of the detected field signature and the first signature;
identifying, via an identifying component, the first location associated with the first signature as the device location, based on the comparison signal;
upon determining, based on the comparison signal, that (a) the detected field signature and the first signature do not match and (b) a difference between the detected field signature and the first signature is within a predetermined threshold:
providing, via a verification component, a request for verification that the device location is the identified first location, based on the comparison signal; and
inputting, via an input component, a verification based on the request for verification.

8. The method of claim 7, wherein said detecting a detected field comprises detecting the detected field as a function over a period of time.

9. The method of claim 7, further comprising:
detecting, via a parameter detector, a parameter; and
generating, via the parameter detector, a parameter signal based on the detected parameter,
wherein said identifying the first location comprises identifying the first location based additionally on the parameter signal.

10. The method of claim 9, wherein said detecting a parameter comprises detecting, as the parameter, one of the group consisting of a geodetic location, time, sound, acceleration, velocity and combinations thereof.

11. The method of claim 7, further comprising wirelessly communicating, via a communication component, with a network.

12. The method of claim 7,
wherein said detecting a detected field comprises detecting the detected field as a first magnetic field, and
wherein said identifying the first location comprises identifying the first location as a driver's position within the car.

13. A non-transitory, tangible, computer-readable media having computer-readable instructions stored thereon, for use with a database having stored therein a plurality of signatures corresponding to a plurality of fields, respectively, each of the plurality of signatures associated with one of a plurality of locations, the computer-readable instructions being capable of being read by a computer and being capable of instructing the computer to perform the method comprising:
accessing, via an accessing component, a first signature from the plurality of signatures stored in the database, wherein the first signature is associated with a first location;
detecting, via a field-detecting component, a detected field present at a device location;
generating, via the field-detecting component, a detected field signature based on the detected field;
generating, via a comparing component, a comparison signal based on a comparison of the detected field signature and the first signature;
identifying, via an identifying component, the first location associated with the first signature as the device location, based on the comparison signal;
upon determining, based on the comparison signal, that (a) the detected field signature and the first signature do not match and (b) a difference between the detected field signature and the first signature is within a predetermined threshold:
providing, via a verification component, a request for verification that the device location is the identified first location; and
inputting, via an input component, a verification based on the request for verification.

14. The non-transitory, tangible, computer-readable media of claim 13, wherein the computer-readable instructions are capable of instructing the computer to perform the method such that said detecting a detected field comprises detecting the detected field as a function over a period of time.

15. The non-transitory, tangible, computer-readable media of claim 13, the computer-readable instructions being capable of being read by a computer and being capable of instructing the computer to perform the method further comprising:
detecting, via a parameter detector, a parameter; and
generating, via the parameter detector, a parameter signal based on the detected parameter,
wherein said identifying the first location comprises identifying the first location based additionally on the parameter signal.

16. The non-transitory, tangible, computer-readable media of claim 15, wherein the computer-readable instructions are capable of instructing the computer to perform the method such that said detecting a parameter comprises detecting, as the parameter, one of the group consisting of a geodetic location, time, sound, acceleration, velocity and combinations thereof.

17. The non-transitory, tangible, computer-readable media of claim 13, the computer-readable instructions being capable of being read by a computer and being capable of instructing the computer to perform the method further comprising wirelessly communicating, via a communication component, with a network.

18. The non-transitory, tangible, computer-readable media of claim 13, the computer-readable instructions being capable of being read by a computer and being capable of instructing the computer to perform the method further comprising:
- wherein said detecting a detected field comprises detecting the detected field as a first magnetic field, and
- wherein said identifying the first location comprises identifying the first location as a driver's position within the car.

* * * * *